No. 731,891. PATENTED JUNE 23, 1903.
W. J. HACKETT.
TORCH.
APPLICATION FILED MAY 7, 1902.
NO MODEL.
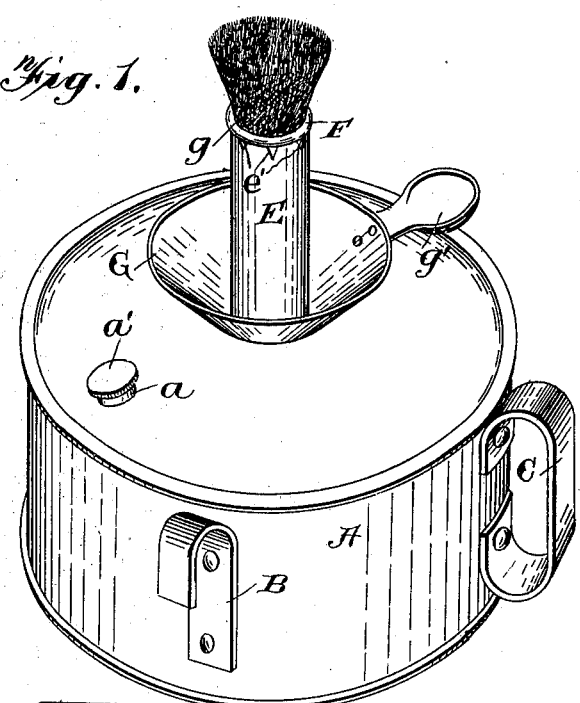
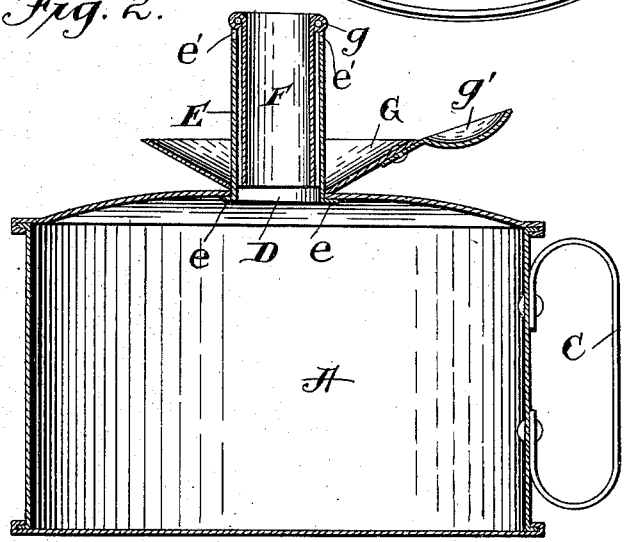
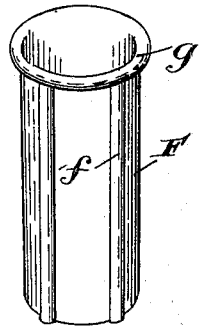
Witnesses
Geo. E. Frech
E. R. Wright Jr.
By
Inventor
W. J. Hackett
A. S. Pattison
Attorney No. 731,891.

Patented June 23, 1903.

UNITED STATES PATENT OFFICE.

WILLIAM J. HACKETT, OF GLOUCESTER, MASSACHUSETTS.

TORCH.

SPECIFICATION forming part of Letters Patent No. 731,891, dated June 23, 1903.

Application filed May 7, 1902. Serial No. 106,326. (No model.)

*To all whom it may concern:*

Be it known that I, WILLIAM J. HACKETT, a citizen of the United States, residing at Gloucester, in the county of Essex and State of Massachusetts, have invented new and useful Improvements in Torches, of which the following is a specification.

My invention relates to improvements in torches, and pertains more particularly to that class of fisherman torches used on boats for fishing purposes.

The object of my invention is to provide a torch having a double tube and the inner tube carrying the wick, which is removable, so that the tube can be easily removed and the wick trimmed or adjusted.

Another object of my invention is to provide a torch in which there is a space between the tube carrying the wick and the outer supporting-tube, thus forming an air-space between the outer tube and the wick-tube, thus preventing the tube from heating and to allow the internal air or gas pressure to pass from the oil-receptacle, and thus preventing the same from forcing the wick from the wick-tube.

A still further object of my invention is to provide a substantial, cheap, and simple torch that will burn at all times and one in which the wick is easily and readily adjusted.

In the accompanying drawings, Figure 1 is a perspective view of my improved torch. Fig. 2 is a vertical sectional view of Fig. 1, taken through the removable wick-tube. Fig. 3 is a perspective view of the removable wick-tube.

Referring now to the drawings, A represents the body or receptacle of the lamp, which is preferably in the form shown, but which may be made of any desired curvature, as this forms no part of my invention. The said receptacle is provided with the filling-opening $a$, which is screw-threaded, and provided with a cap $a'$. Secured to one side of the receptacle is the hook B, by means of which the torch is supported or otherwise held in its proper position on the boat by said hook passing over members carried by the boat and adapted for that purpose. The side of said receptacle is also provided with a handle C, by means of which the torch is transferred from place to place. The said tank or body or receptacle of my torch is preferably made of galvanized iron for the purpose of preventing the same from rusting and having greater strength, thus less liable of being bent and springing a leak and at the same time being cheap, although it could be made of any desired material, such as copper, tin, &c.

The receptacle A is provided with a central opening D, within which is an upwardly-extending tube E, which has its lower end $e$ turned at right angles and fitting snugly the under side of the top of the receptacle A and soldered thereto, thus making a tight joint and protecting the solder from the full extent of the heat from the torch and also protecting it from the falling sparks from the wick, as said joint is directly below the same. The upper edge of said tube is provided with a number of V-shaped notches $e'$, the purpose of which will be hereinafter more fully described. Within the said tube E is a second tube F, which is adapted to receive and support the wick. The said tube is slightly smaller than the tube E and is provided with the vertically-arranged longitudinal ribs $f$, which are adapted to hold the said tube in the center of the tube E, and thus form an air-space entirely surrounding the tube F, or, in other words, forming a draft around the wick.

The upper end of the tube F is provided with a downwardly-turned edge $g$ and in which is secured a wire, thus forming an enlarged rounded upper edge which is adapted to rest upon the upper edge of the tube E, and thus preventing the wick-carrying tube F from passing within the tube E and also forming means whereby the wick-tube may be grasped and removed. By having the upper end of the tube E provided with the notches $e$ it will be readily seen that when the tube F is in its normal position ready for burning the ring-like portion $g$ of the tube F will not close the air-space between the two tubes.

Surrounding the outer tube E is a removable cup-shaped member G, which is provided with a handle $g'$, the purpose of which is to catch the sparks and burned portion of the wick and prevent them from accumulating on the top of the receptacle A. The said cup-shaped member G is loosely placed around the tube E, and when the wick-tube is removed it can be readily removed and the burned portion of the wick carried therewith.

Having thus described my invention, what I claim, and desire to secure by Letters Patent, is—

1. A torch comprising a receptacle, having an opening, a tube within said opening and having an outwardly-turned lower end soldered to the under side of the top of the receptacle, and a removable wick-carrying tube within said first tube, substantially as described.

2. A torch comprising a receptacle, an upwardly-extending tube carried thereby, and having a notched upper end, and a removable wick-carrying tube within said first tube and having a rolled upper end to prevent it from passing through the first tube, substantially as described.

3. A torch comprising a receptacle, an upwardly-extending tube carried thereby and having a notched upper end, and removable wick-carrying tube within said first tube and having a space between said tubes, and the said wick-tube having a rolled upper end to prevent it from passing through the first tube, substantially as described.

4. A torch comprising a receptacle, an upwardly-extending tube carried thereby, and having a notched upper end, a removable wick-carrying tube within said first tube and having longitudinal ribs forming air-spaces between the said tubes, and said wick-tube having a rolled upper end to prevent it from passing through the first tube, substantially as described.

5. A torch comprising a receptacle, an upwardly-extending tube carried thereby having a notched upper end and a removable wick-carrying tube within said first tube and having its upper end provided with an outwardly-extending member to prevent it from passing through the first tube, substantially as described.

6. A torch comprising a receptacle, an upwardly-extending tube carried thereby and having a notched upper end, a removable wick-carrying tube within said first tube and having longitudinal ribs forming air-spaces between said tube and the upper end of said wick-tube having an outwardly-extending member to prevent it from passing through the first tube, substantially as described.

7. A torch comprising a receptacle, an upwardly-extending tube carried thereby and having a notched upper end, a removable wick-carrying tube having a rolled upper end adapted to rest upon the upper end of the outer tube, and a cup-shaped removable spark-catcher surrounding the outer tube, substantially as described.

In testimony whereof I have hereunto set my hand in the presence of two subscribing witnesses.

WILLIAM J. HACKETT.

Witnesses:
SAMUEL MONTGOMERY,
WILLIAM O. GIBSON.